United States Patent [19]

Breyer

[11] Patent Number: 5,496,143
[45] Date of Patent: Mar. 5, 1996

[54] TREE AND SHRUB LIFTING SYSTEM

[76] Inventor: Stephen R. Breyer, Tripple Brook Farm, 37 Middle Rd., Southampton, Mass. 01073

[21] Appl. No.: 225,642

[22] Filed: Apr. 11, 1994

[51] Int. Cl.⁶ .................................................. A01G 23/02
[52] U.S. Cl. ........................................ 414/23; 294/82.13
[58] Field of Search .................. 414/23, 24.5; 294/82.13

[56] References Cited

U.S. PATENT DOCUMENTS

| 14,937 | 5/1856 | Leigler et al. | 294/82.13 |
|---|---|---|---|
| 119,729 | 10/1871 | Whitall et al. | 294/82.13 |
| 640,889 | 1/1900 | Dunbar | 414/23 |
| 700,671 | 5/1902 | Hammer | 414/23 |
| 700,821 | 5/1902 | Ralston | 414/23 |
| 713,501 | 11/1902 | Ryder | 414/23 |
| 1,763,707 | 6/1930 | Irish | 414/23 |
| 1,795,174 | 3/1931 | Lewis | 414/23 |
| 2,258,289 | 10/1941 | Jeffrey | 414/23 |
| 2,792,948 | 5/1957 | De Shano | 414/23 |
| 4,179,847 | 12/1979 | Osterwalder | 47/76 |
| 4,271,611 | 6/1981 | Paul | 37/2 R |
| 4,301,605 | 11/1981 | Newman | 37/2 R |
| 4,403,428 | 9/1983 | Chapman, Jr. et al. | 37/57 |
| 4,625,662 | 12/1986 | Heinzen | 111/2 |
| 4,951,584 | 8/1990 | Pearce | 111/101 |
| 5,054,831 | 10/1991 | Ting et al. | 294/61 |
| 5,156,101 | 10/1992 | Wien | 111/101 |

FOREIGN PATENT DOCUMENTS

| 775999 | 1/1935 | France | 414/23 |
|---|---|---|---|
| 646865 | 10/1962 | Italy | 414/23 |

OTHER PUBLICATIONS

Pp. 2 and 20 from *A. M. Leonard, Inc.* Fall 1993 mail order catalog.

*Primary Examiner*—Margaret A. Focarino
*Assistant Examiner*—Thomas J. Brahan
*Attorney, Agent, or Firm*—Fulwider Patton Lee & Utecht

[57] ABSTRACT

A set of lifting hooks for lifting a tree or shrub with a root ball in preparation for transplanting said tree or shrub. A hand cart for use in lifting is also disclosed. The set of hooks positioned under the root ball may be lifted by means of attachment to the rear edge of the hand cart while said hand cart is in a vertical position and rotating said hand cart toward the horizontal. The hand cart may be supplied with long handles to provide additional leverage when they are pulled to rotate the cart from the vertical to the horizontal.

8 Claims, 2 Drawing Sheets

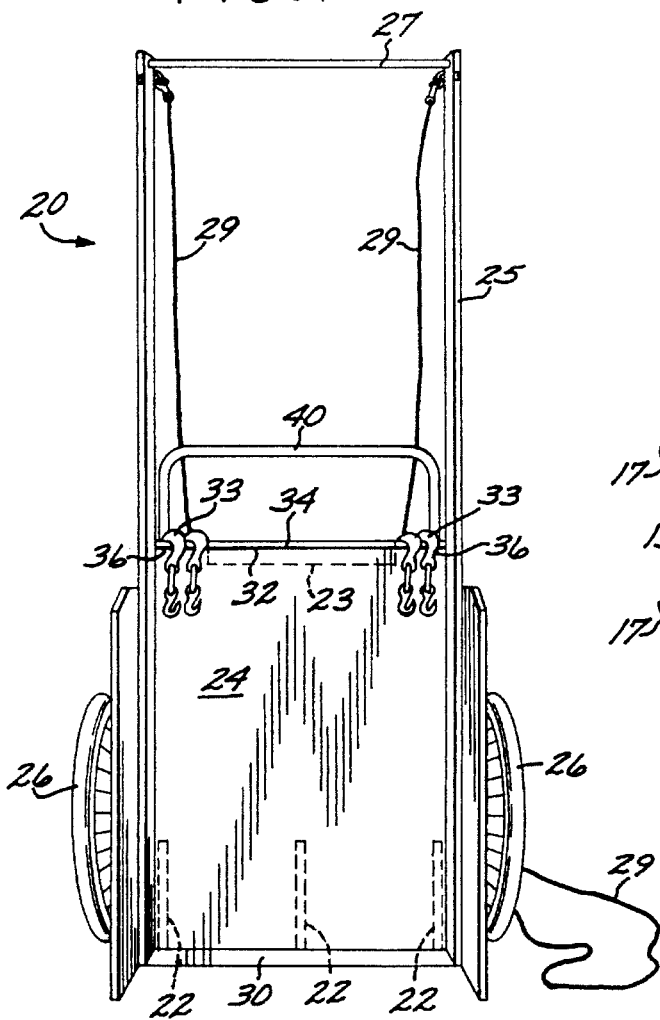
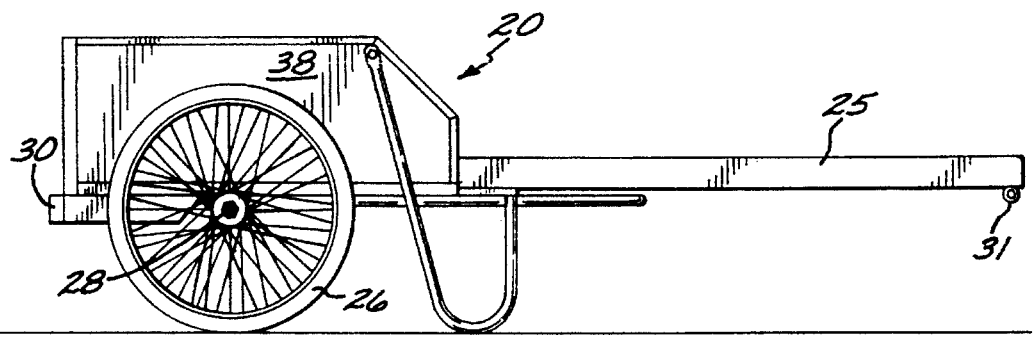

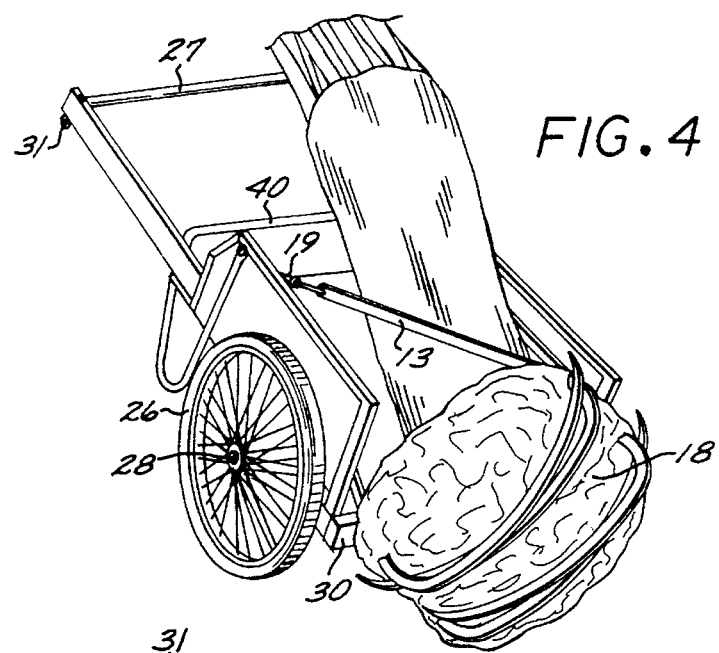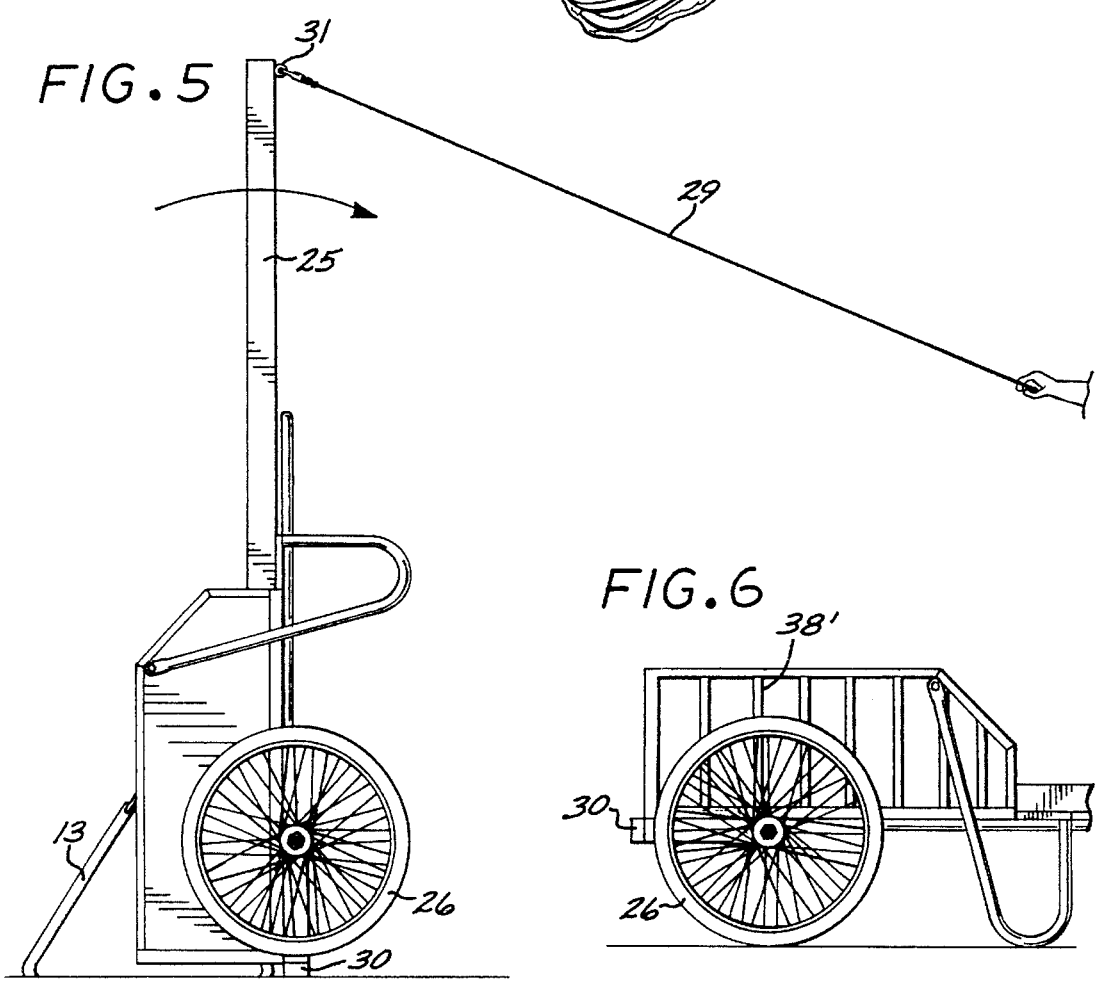

TREE AND SHRUB LIFTING SYSTEM

BACKGROUND OF THE INVENTION

This invention relates to a system and method for lifting trees, shrubs, and other plants from the ground for transplanting and more particularly, to a system and method for manually lifting plants with root balls attached to them for transplanting.

Digging and transplanting field-grown trees and shrubs is an important part of the nursery and landscaping business. Trees and shrubs which are grown in the nursery or found growing wild are generally transplanted to another location using either the bare root technique or the balled and burlapped ("B&B") technique. This invention relates to transplanting using the B&B technique.

In bare root transplanting, the root system of the plant to be transplanted is isolated by digging around the plant with a hand spade or the like. The plant is then removed from the ground and the soil is removed from the root system. The plant with its bare root system may then be transplanted. The bare root technique is generally appropriate only for small, dormant deciduous tress and shrubs up to 6 feet tall or small, dormant evergreens up to 1 foot tall. While this technique has the advantage of producing specimens for transplanting that are relatively light and easy to handle, it is generally not an appropriate technique for many of the larger trees and shrubs that a nurseryman or landscaper would want to transplant.

Plants of relatively large size with a significantly developed root system are generally transplanted along with a root ball made up of the roots of the plant extending for some distance from the base of the trunk and the soil surrounding those roots. For handling after the plant is dug, the root ball is generally wrapped in burlap or other similar material. Thus this method of digging and transplanting trees and shrubs is referred to as the balled and burlapped method, or "B&B" transplanting.

To transplant a tree or shrub using the B&B technique, the first step is to determine the size of root ball desired. The appropriate size of the root ball will vary with the variety of plant being transplanted and the size of the specimen involved. A general rule of thumb is that the root ball should be about 10 times the diameter of the trunk, measured just above the basal flare. Once the appropriate size of the root ball has been determined, the outline of the desired root ball can be laid out on the ground, and the root ball can then be dug following the outline. Depending on the size of the root ball and the depth desired, the root ball may be dug using a garden spade or various mechanical devices well known in the art.

A root ball for a relatively small tree or shrub may be prepared using a garden spade. The spade is used to cut the root ball free of the surrounding soil, as follows. The blade of the spade is driven into the ground along the outline of the root ball, angling the handle of the spade away from the plant at about 20 degrees from the vertical. The handle of the spade is then pried down and away from the plant slightly each time the spade is fully inserted into the soil to gently break the root ball free. Any roots which cross the cut line, down to the depth of penetration of the spade, are severed and a clear line of separation is established in the soil.

Once the root ball has been cut as described above, it may be lifted out of the ground, provided that the root ball is not too large and not too many uncut roots remain. For relatively small plants, it is possible to pry the root ball out of the ground with a spade. A root ball which is too heavy or bound by too many roots to yield to one person prying upward with a spade will sometimes yield to two or more people prying or pulling simultaneously.

In the case of a root ball that is too large to pry out of ground with a spade, the tree with its root ball weighing up to 500 pounds may sometimes be manually lifted to ground level as follows. A trench surrounding the root ball is excavated. Wrapping material such as burlap is put in place around the root ball after a trench has been excavated around the root ball, but before the root ball has actually been moved. Two or more people are then generally required to lift the root ball using the following procedure. One person shovels soil into the hole under the root ball, while an assistant, using the trunk of the tree or shrub as a lever, tilts the root ball from side to side. As the hole is filled under the root ball, the root ball will gradually "walk" its way up to the surface. Once at the level of the surrounding ground, the tree or shrub with its wrapped root ball may be moved. While suitable for some purposes, this method requires more than one person and is generally time consuming and cumbersome.

Alternatively, a trench around the tree or shrub may be excavated as described above and the root ball wrapped. A ramp is then dug from ground level to the base of the root ball. A two-wheeled hand truck (sometimes called a nursery truck) may then be pushed down the ramp, and the root ball placed on the hand truck. The hand truck may then be pulled back up the ramp to ground level. While this does allow a single worker to dig and lift a larger plant by hand, it requires arduous and time consuming excavation around the tree and wrapping the root ball while it is still in place in the ground.

In the alternative, to raise such large root balls, mechanically powered lifting devices, such as tractor mounted lifts and slings may be employed. Again, it is generally desirable to excavate a trench around the root ball and to wrap the root ball in burlap or other suitable material before handling. This requires additional time and effort in preparing the root ball, and generally results in the area surrounding the plant being substantially disturbed. Use of the power lifting equipment also requires that the site be accessible to the equipment, which is generally relatively heavy and large.

Certain other mechanical devices exist to dig, enclose and lift a large tree or shrub. In one such device, two or more broad blades are mounted on a power digger. The blades are positioned around the outline of the root ball to be dug with the leading edge of each blade at a suitable downward angle. The blades are then driven downward into the ground so that they meet under the plant and essentially enclose the root ball within the blades. The blades may be mechanically interlocked to strengthen the rigid container formed when they are in place under the root ball. The root ball and plant may then be lifted by power supplied by, for example, tractor mounted hydraulic equipment lifting the blades directly up.

Another type of mechanical digger/lifter is known in the art as a "U-blade" digger. In this device, a single blade in the shape of a "U" is mounted on a tractor or similar device. The blade is positioned so that the front of the blade is pointed down into the ground just outside the outline of the root ball to be dug. The blade is then driven down into the ground and simultaneously rotated under the plant so that it essentially scoops the root ball into the "U" of the blade. It may then be lifted out of the ground. However, because of the tensile strength of the roots and their holding power in the ground, it is advisable to at least partially cut the root ball free with a hand spade as described above before digging and lifting with a "U-blade" power digger.

Such diggers are available in models that may handle root balls up to 60 inches in diameter. They do, however, have a tendency to encounter a number of roots simultaneously as the broad front of the blade moves slowly through the ground, and to push those roots through the dirt rather than cut them cleanly. This requires significant power that may stall the digger. It may also lead to greater root damage than a device which cleanly cuts the roots.

These diggers, and indeed all of the mechanical slings and diggers, require power equipment to operate and are generally associated with a tractor, fork lift or other vehicle that may have difficulty accessing remote locations and steep or soggy terrain. It may not be possible to operate these vehicles in crowded locations with many trees or limited access. They may do significant damage to surrounding plants and other environmental aspects of the area around the trees or shrubs to be transplanted. The power equipment has attendant expense, maintenance, and safety considerations avoided by the manual lifting system of this invention. The blades used for digging and lifting may also require a heavy and stable base or other supporting structure. Generally, they also substantially enclose the root ball as it is being dug and lifted, making grooming of the root ball impractical.

SUMMARY OF THE INVENTION

This invention provides an inexpensive and relatively environmentally benign system and method for transplanting trees and shrubs with root balls. The invention consists of a plurality of independent hooks each having an upright leg attached to a transverse arm which ends in a point. The transverse arm is in the form of a slender beam or rod and may be shaped as a shallow curve. The upright leg has a flexible lifting member such as a rope or chain attached to its upper end. The flexible member, in turn, may be fastened by means such as clasps or grab-hooks to a lifting device.

After the root ball of the tree or shrub to be transplanted has been cut free of the surrounding soil by a hand spade or the like, the hooks may be inserted under the root ball. This can generally be done manually as by pushing with the hands, driving the hooks into the ground with the feet, or driving them into the ground with a hand tool such as a mallet, since the transverse arm is slender and, unlike a broad blade, does not have a broad leading edge to be forced through the soil. The hooks also do not directly attach to each other under the root ball and therefore the hooks may be independently positioned around the outline of the root ball at a location convenient for inserting the hooks, for example, away from rocks or other obstructions, with minimal regard for the location of the other hooks. Prior art devices which use interlocking blades or the like under the root ball require far more precise positioning of the blades and are less adaptable to the individual conditions encountered.

The ropes or chains at the upper end of the upright legs may be fastened to a lifting device so that they may all be lifted simultaneously. When this occurs, the plurality of hooks will lift the root ball (and thus the plant) out of the ground.

When lifted, the hooks also do not fully encase the root ball so that it is substantially exposed and pruning of roots and removal of excess superfluous soil may be done while the root ball is suspended from the hooks and before the root ball is encased in burlap.

The invention may also include a lifting device in the form of a hand cart. This device is in the nature of a flatbed hand cart with no front or back panel. There may be no sides, or alternatively it may have sides .either in the nature of panels or side rails. It may be mounted on wheels and may include a reinforced front edge and rear edge of the bed of the cart. The cart will generally have handles along the sides of the cart that may be as longer than typical for hand carts. It may include fastening points at the reinforced rear end of the bed of the cart to provide a point of attachment for the flexible members once the hooks have been positioned under the root ball to be lifted. Additionally, the cart may be provided with a rope or other pulling means for pulling on the end of the handles to provide force to rotate the cart from the vertical to the horizontal position as will be described below. Using this invention in the manner described below, root balls that are too heavy to be directly lifted may be manually lifted from the ground. Additionally, the tree so lifted may be automatically deposited on the bed of a wheeled cart for subsequent handling.

Since the transverse arm is relatively slender, the hook may be inserted under the root ball with less force than if it were a broad blade. This makes it possible to manually insert the blades and avoid the expense, maintenance and safety problems associated with power equipment needed to drive a blade into the ground under a large root ball.

The method of lifting plants of this invention begins with a preparation of the root ball. Because it is not necessary to wrap the root ball before lifting the plant from the ground, the arduous task of excavating a trench around the root ball is avoided. Rather, the hooks may be readily inserted without extra digging beyond what is necessary to cut the root ball free of the surrounding soil.

The hooks are then inserted under the root ball, generally in opposing pairs, until the upright leg of the hook is approximately straight up and down. The cart of the invention is then positioned vertically at the base of the tree, with its handles extending upward and the reinforced front edge fulcrum resting on the ground outside the root ball.

The ends of the flexible members are snugly fastened to the rear edge of the cart. The cart is then rotated toward the horizontal which pulls on the hooks and lifts the plant from the ground. Because of the shape of the hooks, there is no tendency of the hooks to rotate off of the root ball. Rather, the lifting force causes the hooks to firmly grasp the root ball as it is lifted. The tree or shrub, along with its root ball, is conveniently deposited on the bed of the hand cart. After the root ball is lifted from the ground, it will be exposed and may be shaped, pruned and otherwise groomed before encasing it in burlap.

Other features and advantages of the invention will become apparent from the following detailed description, taken in conjunction with the accompanying drawings, which illustrate by way of example the features of the invention.

BRIEF DESCRIPTION OF THE DRAWINGS

FIG. 1 is a top plan view of one embodiment of a cart of the invention;

FIG. 2 is a side view of one embodiment of a cart of the invention;

FIG. 3 is a side view of a set of hooks of the invention;

FIG. 4 is a perspective drawing showing a cart and set of hooks of the invention in use;

FIG. 5 is a side view of a set of hooks and cart of the invention showing the pull rope in use;

FIG. 6 is a side view of an alternative embodiment of a cart of the invention.

DETAILED DESCRIPTION

According to the present invention, there is supplied a set comprising a plurality of individual hooks 11 each of which has an upright leg 13 and a transverse arm 15 terminating in a pointed and slightly upturned end section 17.

The upright leg is a rigid elongate member of a strong material such as steel. While the exact height is not critical, a height of approximately two and one half feet has been found to be useful. The upright leg extends between the transverse arm at its lower end and a chain 19 attached to its upper end. The length of chain is also not critical, but a length of approximately three feet has been found to be useful.

The transverse arm 15 extends outward from the lower end of the upright leg. It too is of strong material such as steel and may, in fact, be of one-piece construction with the upright leg. A length of approximately two and one half feet has been found to be useful for this structure. It is formed in a gentle arcuate shape extending from the upright leg at an angle of slightly more acute than 90°. The transverse arm defines an arc whose radius is approximately the length of the upright leg. The length of the transverse arm, its shape, and its angle of attachment combine to place the center of gravity of the load carried by the hook approximately over the center of the transverse arm and approximately below the top end of the upright leg, and it is angled so that when the hook is lifted from the top of the upright leg, the transverse arm is angled slightly upward and does not tend to slip off of a root ball cradled in the hook. The transverse arm is slender in shape, perhaps round, rectangular, triangular or even "T" shaped in cross section, and may present a cross-sectional area of, for example, ⅔ square inches, and terminates in a pointed end section 17. The pointed end section may be slightly upturned relative to the gentle, arcuate shape of the transverse arm. This slight upturn of the pointed end section further tends to aid in gripping and retaining the root ball held by the hook.

In use, a root ball 18 of a plant to be transplanted may be prepared by outlining the root ball around the plant and driving a spade or similar instrument into the earth to sever the roots and loosen the earth around the plant. The hooks may then be inserted under the plant, generally in pairs opposing one another. The chains 19 located at the upper end of the upright leg are fastened to a lifting device and lifted simultaneously, thereby lifting the root ball and plant from the earth. The root ball is securely cradled by the hooks which, because of their configuration, do not have a tendency to slip off of the root ball, but rather tend to remain hooked under the root ball. No additional fastening is needed as might be the case with a broad blade driven only part way under the root ball and lifted. The lifting force itself holds the hook in place.

The invention may further be supplied with a lifting device in the form of a specially adapted hand cart 20. The hand cart comprises a bed 24 mounted on an axle 28, which in turn is attached between wheels 26. The front edge of the bed has attached an extension which serves as a fulcrum 30, reinforced with lengths of 2×4 lumber 22 fastened to the underside of the bed. The reinforcing 2×4 lumber may be of a length of the distance between the front edge fulcrum 30 and the axle 28, or perhaps longer. The length between the front edge fulcrum and the axle is preferably greater than one radius of the wheels 26. In this manner, the reinforced front edge fulcrum 30 may serve as the fulcrum initially when the cart is placed in a vertical position resting on its front end and rotated towards the horizontal before the wheels contact the ground. After the wheels contact the ground, the cart rotates about the axle, thereby applying less mechanical advantage to lifting and pulling the chains than is applied before the wheels contact the ground.

During the initial stages of lifting as is shown in FIG. 5, greater force is required to break loose any remaining uncut roots and to disengage the root ball from the surrounding soil. At this time, the cart is rotated about the front edge fulcrum 30 of the cart creating tremendous mechanical advantage. When the wheels contact the ground and the cart rotates on the axle, less mechanical advantage is applied to pulling the chains 19. By this time, however, the root ball generally has been broken free of the ground and less force is needed to lift the root ball. However, the distance that the root ball is lifted relative to the travel of the lifting arms 25 is greater with the axle serving as the fulcrum. If the initial rotation of the cart is caused using the pulling ropes 29, as will be described below, at about this stage in the lifting process, it is usually possible to reach the crossbar 27 and pull directly down on it. Additionally, a portion of the plant may already be leaning into the cart, adding to the weight which tends to rotate the cart towards the horizontal. Therefore, rotating the cart about its axle provides sufficient lifting power and enhanced lifting distance.

The rear edge of the bed 32 may also be reinforced with, for example, a reinforcing steel angle iron 34 and a reinforcing length of 2×4 lumber 23 affixed to the underside of the bed. The reinforcing 2×4 23 is preferably of a length less than the width of the bed and is centered along the rear edge of the cart. This creates attachment points 36 along the rear edge beyond each end of the 2×4 which are useful in preventing chains hooked along the rear edge of the cart from sliding toward each other and the center of the rear edge.

Each chain 19 may be attached to the rear edge with a clasp such as a grasping hook 33 which may be used to attach the chain 19 to the rear edge 32 of the bed. By attaching these in pairs along the rear edge at the spaced apart attachment points, the hooks may be lifted together but from lifting points appropriately spaced apart to insure that the force of lifting is applied to the cart and hooks in a favorable location and a balanced fashion.

The sides of the garden cart may be open or may, in the alternative, be provided with side panels 38 or rails 38'. Further, a pushing handle 40 may be attached to the cart along the sides near the rear of the cart bed. Turning handles 25 extend rearward from the side of the cart for a distance greater than that of the pushing handle. A crossbar 27 may extend between the two turning handles at the distal end of the turning handles. Fastening points such as eye bolts 31 may also be located at the distal end of each of the turning handles. A pulling rope 29 may be attached, either to the crossbar 27 or to the eye bolts 31.

In use, a root ball is prepared for transplanting as described above, and a set of hooks 11 is inserted under the root ball. The hand cart is positioned in a vertical position resting on the reinforced front edge fulcrum 30 of the bed outside the circumference of the root ball. The bed of the cart 24 is facing the plant to be lifted, with the underside of the cart facing away from the plant.

The chain 19 of each of the hooks is attached to the reinforced rear edge 32 of the cart bed by means of snugly attaching the chains to the grasp hooks 33 and attaching the grasp hooks to the rear edge of the cart bed in pairs located at the attachment points 36.

The garden cart is then rotated from the vertical position towards the horizontal. This may be done by pulling directly on the lifting arms 25 or the crossbar 27. Alternatively, the operator may grasp a pulling rope 29 attached to the crossbar or pulling arms, and standing some distance back from the cart, pull to rotate the cart from its vertical position towards a horizontal position. This is generally illustrated in FIG. 5. In doing so, significant pulling force is applied against the chains 19, thereby lifting the root ball by means of the hooks 11 positioned under the root ball.

An additional advantage is often achieved in that, when the plant is lifted, it is simultaneously deposited into the wheeled cart and may be moved to another location for transplanting or for depositing the root ball on a piece of burlap or other wrapping material for wrapping and subsequent handling. Additionally, immediately after lifting, the root ball may be suspended in the air if the cart is secured in the horizontal position. The surface of the root ball is exposed because the narrow hooks do not significantly encase the root ball, so it may be conveniently groomed, cleaned, shaped and wrapped for further handling.

By use of the invention, an inexpensive means for lifting and moving plants with heavy root balls may be achieved. Because the invention does not require power equipment or heavy vehicles, plants located where they might otherwise be inaccessible, can be quickly and easily dug and lifted for transplanting. For the same reason, excessive damage to surrounding plants or the environment may be avoided by use of this hand lifter. The use of such a cart with extended turning handles and a pulling rope will allow the user to lift plants having root balls which would be too large for typical manual lifting otherwise, and allows the user to do so without the need of several people assisting in the process.

While a particular form of the invention has been illustrated and described, it will be apparent that various modifications can be made without departing from the spirit and scope of the invention.

What is claimed is:

1. A system for lifting trees or shrubs for transplanting comprising:

a set of a plurality of hooks each said hook having an upright leg, a transverse arm, and an angled section between said upright leg and said transverse arm;

each said upright leg having an upper end and a lower end, said upper end affixed to a flexible lifting member, said lower end affixed to said angled section;

said transverse arm having an arcuate shape and a pointed end, said transverse arm extending between said angled section and said pointed end, said transverse arm being formed of a slender, elongate member;

said angled section being shorter than said transverse arm and forming an angle of approximately 90°, said angled section having a radius of curvature smaller than the radius of curvature of said arcuate transverse arm;

a cart, said cart having a bed, and an axle fulcrum;

said cart having a fastening point, wherein when said cart is in the vertical position, the flexible lifting member can be attached to the fastening point, and then the cart can be rotated around the axle fulcrum from the vertical position toward the horizontal position, and thereby a lifting force can be applied to the hook attached to the lifting member.

2. A system for lifting trees and shrubs as in claim 1, further comprising:

said bed having two side edges, a front edge and a rear edge;

a wheel mounted on said bed by an axle, said axle constituting said axle fulcrum;

said fastening point located at the rear edge, wherein when said cart is in the vertical position, said flexible lifting member can be attached to said fastening point, said cart can be rotated from the vertical position toward the horizontal position, and a lifting force can thereby be applied to said hook attached to said lifting member.

3. A system as in claim 2, further comprising:

a plurality of fastening points spaced apart along said rear edge and separated by separating means.

4. A system as in claim 2, further comprising:

a handle having an attachment portion and a distal end, said attachment portion fastened to said bed, said distal end being furthest from said front edge;

a pulling rope attached to said distal end, wherein when said cart is in a vertical position, the pulling rope may be pulled to apply a force tending to rotate said cart from the vertical position toward a horizontal position.

5. A system as in claim 2, further comprising:

a strut for reinforcing said rear edge.

6. A system as in claim 1, wherein:

said arcuate transverse arm has a center of gravity, said center of gravity being between said pointed end and said angled section;

said flexible lifting member attached to said upper end at an attachment point; and when said hook is suspended from said attachment point, said attachment point is located above a point on said transverse arm between said center of gravity and said angled section.

7. A system as in claim 6, wherein:

said angled section forms an angle slightly more acute than 90°.

8. A system as in claim 1 wherein:

said bed has a front edge and said cart has a front edge fulcrum at said front edge of said bed;

said front edge fulcrum spaced apart from said axle fulcrum by a distance greater than the radius of said wheel.

* * * * *